United States Patent [19]

Hoge et al.

[11] Patent Number: 5,333,810
[45] Date of Patent: Aug. 2, 1994

[54] RAISED LINEAR THREADING MECHANISM FOR A TAPE TRANSPORT SYSTEM

[75] Inventors: David T. Hoge, Westminster; John C. Owens, Arvada, both of Colo.

[73] Assignee: Storage Technology Corporation, Louisville, Colo.

[21] Appl. No.: 60,663

[22] Filed: May 13, 1993

[51] Int. Cl.⁵ .............................................. G11B 23/04
[52] U.S. Cl. ............................... 242/332.4; 242/348.3
[58] Field of Search .................... 242/195; 360/85, 95; 226/91, 92

[56] References Cited

U.S. PATENT DOCUMENTS

| | | | |
|---|---|---|---|
| 4,399,936 | 8/1983 | Rueger | 242/195 |
| 4,399,959 | 8/1983 | Godsoe et al. | 242/195 |
| 4,452,406 | 6/1984 | Richard | 242/195 |
| 4,477,851 | 10/1984 | Dalziel et al. | 360/95 |
| 4,704,645 | 11/1987 | Murphy et al. | 360/95 |
| 4,706,140 | 11/1987 | Muller | 360/85 |
| 4,742,407 | 5/1988 | Smith et al. | 360/95 |
| 4,763,210 | 8/1988 | Grant | 360/84 |
| 4,809,099 | 2/1989 | Murphy et al. | 360/95 |
| 4,864,511 | 9/1989 | Moy et al. | 360/92 X |
| 4,928,245 | 5/1990 | Moy et al. | 360/92 X |
| 4,932,826 | 6/1990 | Moy et al. | 360/92 X |
| 4,991,037 | 2/1991 | Shimizu et al. | 360/71 |
| 5,003,416 | 3/1991 | Bumb | 360/85 |
| 5,046,168 | 9/1991 | Ohsaki | 360/95 |
| 5,128,815 | 7/1992 | Leonhardt et al. | 360/85 |
| 5,155,639 | 10/1992 | Platter et al. | 360/95 |
| 5,164,868 | 11/1992 | Mosher et al. | 360/85 |
| 5,166,843 | 11/1992 | Kuwajima | 360/85 |

FOREIGN PATENT DOCUMENTS

WO90-16066 12/1990 World Int. Prop. O. .......... 242/195

*Primary Examiner*—Daniel P. Stodola
*Assistant Examiner*—John P. Darling
*Attorney, Agent, or Firm*—Sterne, Kessler, Goldstein & Fox

[57] ABSTRACT

A linear threading apparatus for threading a tape through a predetermined path in a tape transport mechanism. The tape transport mechanism typically has an elevator assembly to receive a single-reel tape cartridge having a web of tape and a leader block, a tape drive assembly for reading and writing data on the tape, and a take-up reel assembly for receiving the tape. The linear threading mechanism includes a platform having a cam track positioned above the predetermined path that the tape is to travel. The platform has a linear bearing mechanism which provides a linear track from a point proximate to the elevator assembly to a point proximate to the take-up reel. A linear arm is attached to and travels freely over the linear bearing mechanism. Pivotally attached to the linear arm is a threading arm which is coupled with and travels in the cam track as the linear arm travels along the linear bearing mechanism. The linear arm is connected to and controlled by a belt and motor assembly. The cam track has a profile such that the threading arm properly positions the leader block of the tape along the predetermined path as the threading arm travels along said cam track.

13 Claims, 6 Drawing Sheets

RAISED LINEAR THREADING MECHANISM FOR A TAPE TRANSPORT SYSTEM

BACKGROUND OF THE INVENTION

1. Field of the Invention

This invention relates to tape transport systems and, more particularly, to tape threading mechanisms utilized to feed tape along a path between tape supply and take-up reels in a tape transport mechanism.

2. Related Art

Off-Line Data Storage Development

In the course of developing various systems for the storage of data on magnetic recording tape, particularly for high volume data storage devices, a variety of different formats have been developed. Many of these formats call for the tape to be contained in an appropriate cartridge, both to facilitate handling of the tape while in use, and to protect the tape while in storage.

To this end, the IBM Corporation has developed a tape cartridge which is primarily intended for use in its Model 3480 data storage system for the storage of relatively large quantities of data (on the order of 200 megabytes). Details regarding the construction of this type of tape cartridge (hereinafter referred to as a 3480-type cartridge) may be found in U.S. Pat. No. 4,452,406.

By way of general description, the 3480 tape cartridge is a single reel cartridge with a length of ½ inch wide magnetic tape stored in it. The cartridge housing protects the tape from damage while allowing the tape reel to be driven from a drive mechanism on the underside of the cartridge housing. The tape is withdrawn from an opening formed at one corner of the cartridge. A leader block attached to a free end of the tape allows the tape to be withdrawn from the cartridge for read/write operations.

The 3480 tape cartridge has found wide acceptance in the data storage industry for a variety of reasons. One important reason for this is that, unlike other types of tape cartridges and cassetes which have been developed for use in the off-line storage of data, the 3480 tape cartridge houses only a single reel of magnetic recording tape in a relatively small, space-efficient package. The resulting package is therefore conveniently stored and easily used.

Data Storage Formats

High density storage of data on a flexible medium has involved the use of tape media stored in both cartridges and cassettes, with the associated drive and record/playback mechanisms recording in one of three formats. The first is on tracks which run the length of the tape, normally referred to as the streaming or streamer technique. The second is on tracks disposed at angles relative to the length of the tape, normally recorded by helical heads in a manner similar to the technique used in video recorders. The third method, referred to as direct access recording, is on groups of short length tracks recorded on a discrete length of the tape, normally accomplished by selectively positioning a length of tape around a rotating head such that the head records a short longitudinally directed tract.

Commercially available helical scan videotape transports can be the basis of very high data density magnetic tape data storage subsystems. The helical scan tape transport architecture has been applied to computer systems data storage in the form of modified helical scan tape transports which use either 4 mm, 8 mm, or ¼ inch magnetic tape formats. Unfortunately, all of these helical scan tape transports are designed for cassette-type media that is not compatible with existing data processing media handling systems. In addition, the videotape cassette media is not mechanically well suited to the rigors of the commercial data processing environment. Moreover, typical helical scan tape cassettes contain both supply and take-up reels, with the provision of the empty take-up reel in each cassette representing an inefficient use of space.

Tape Transport Mechanisms Utilizing Cartridges

Tape transport mechanisms which use single-reel cartridges such as the 3480 tape cartridge must provide special means to engage the leader block assembly and guide the leader block (and the tape which follows) through the tape transport system. This requires care in withdrawing the leader block from the tape cartridge and in guiding the web of tape from the tape cartridge supply reel, past the read/write head, and into engagement with the take-up reel. The take-up reel includes a slot for receiving the leader block and is connected to an associated drive mechanism which transports the tape between the take-up reel and supply reel.

Cartridge tape transport mechanisms require the above operation prior to reading/writing data on the magnetic tape. This is referred to as longitudinal tape loading. However, helical tape transport mechanisms require two separate steps before reading/writing data. First, the magnetic tape must be pre-loaded into the helical tape transport system. This step is analagous to the longitudinal tape loading described above. Secondly, the helical drive assembly has to wrap the magnetic tape at a complex angle around the rotary scan head in order for the read/write operation to take place.

Longitudinally loading a tape in a non-helical tape transport system or performing the pre-load operation in a helical tape transport system necessitates the development of an appropriate means for threading the leader block through the tape path. The means must have sufficient driving force to withdraw the leader block from its normally seated position within the tape cartridge and to replace the leader block within this normally seated position after the tape cartridge has been used.

While a helical tape transport system supporting single reel tape cartridges such as the 3480 tape cartridge is not yet commercially available, one is described in commonly owned U.S. Pat. No. 5,128,815 to Leonhardt et al. Leonhardt et al. teaches positioning a cartridge and a take-up reel in a helical transport so that a cassette is emulated. Another helical transport is described in a commonly owned U.S. patent application titled "Helical Scan Transport For Single Reel Tape Cartridge," filed concurrently herewith, and naming as inventors David T. Hoge, William C. Dodt, and John C. Owens, Ser. No. 08/060,653; which is incorporated herein by reference.

Tape Threading Mechanisms

In order to follow the complex tape threading path, conventional tape transport mechanisms use jointed tape threading arms. The use of a jointed tape threading arm requires space for the arm to sweep through its range of motion. In addition, the shape of the tape path is limited to the possible movements of the jointed arm. The single or jointed threading arms that rotate from a fixed point have been typically used to perform the longitudinal tape loading described above. However, they are generally not suitable to perform the two step process required of helical tape transport mechanisms, due to their inefficient use of space. In addition, the tape path must be such that the threading arm may reach it from a single pivot point. This results in a larger apparatus as the length of the tape path increases and proximity of the take-up and supply reels increases.

Another conventional approach to tape loading has been the use of a magnetic tape configuration that consists of a two-reel tape cassette. In some applications, the two-reel cassette is configured such that the reels are placed coaxially one over the other. this provides an angled tape path within the tape cassette between the two reels. A window is provided in the front of the cassette so that a tape threading mechanism can access a length of tape to retrieve it from within the tape cassette and wrap it around the rotary heads of the helical scan tape transport.

The tape retrieved from the tape cassette is on an angular relationship with the take-up and supply reels, and this angular relationship must be maintained as the tape is applied to the rotary head in order to enable the writing of data in helical scan format thereon. Complex tape guide mechanisms are provided in this type of apparatus to maintain the proper angular relationship of the tape to the rotary head.

Another conventional helical scan system is the videocassette recorder (VCR) tape transport that makes use of a rotary head and analog video recording in a helical scan format. The VCR mechanism obviates the need for a complex tape threading apparatus by placing two reels in the tape cassette in a coplanar, juxtaposed relationship. Instead of angling the tape, the rotary head is angled with respect to the coplanar source and take-up reels. In this manner, the tape maintains a coplanar transport relationship with the source and take-up reels. The head is positioned to be at the proper angular relationship with the recording surface of the tape.

What is needed is a tape threading mechanism which will be capable of threading the tape of a single-reel cartridge, similar to that of the 3480 tape cartridge, through a tape transport mechanism to a take-up reel which is not proximate to the supply reel.

SUMMARY OF THE INVENTION

The present invention is a linear threading mechanism for threading a tape through a predetermined path in a tape transport system. The tape transport mechanism typically has an elevator assembly to receive a single-reel tape cartridge having a web of tape and a leader block, a tape drive assembly for reading and writing data on a tape, and a take-up reel assembly for receiving the tape.

The linear threading mechanism includes a platform positioned above the predetermined path through which the tape is to travel. The platform has a linear bearing mechanism which provides a linear track from a point proximate the elevator assembly to a point proximate the take-up reel. There is a linear arm which is attached to travel freely over the linear bearing mechanism.

Pivotally attached to the linear arm is a threading arm which travels along a cam track as the linear arm travels along the linear bearing mechanism. The linear arm is connected to and controlled by a drive mechanism. The cam track has a profile such that the threading arm properly positions the leader block and associated web of tape along the predetermined tape path as the threading arm travels along the cam track.

The path of the threading arm for the raised linear threading mechanism has a beginning point for positioning a longitudinal cam member into engagement with the magnetic tape leader block which is exposed through an opening in the tape cartridge. The tape threading arm is connected to the longitudinal cam member and traverses via a servo controlled drive motor. The drive motor activates the tape threading arm to transport the longitudinal cam member from the end of the cam track, where it engages the leader block, to a slot in the take-up reel. As it traverses this path, the magnetic tape is threaded through the tape threading path. Due to the complex nature of this tape threading path, a servo mechanism controls the threading arm operation to pull the tape at variable speeds and provides a constant tension on the tape as it is being withdrawn from the tape cartridge and transported to the take-up reel.

The linear threading apparatus of the present invention is therefore able to thread a tape from a single-reel cartridge through a tape transport mechanism to a take-up reel which is not proximate to the supply reel. The use of the linear threading mechanism does not restrict the tape path to any specific shape or distance. In addition, the linear threading mechanism does not require any additional cross-sectional area in the tape transport system.

Further features and advantages of the present invention, as well as the structure and operation of various embodiments of the present invention, are described in detail below with reference to the accompanying drawings. In the drawings, like reference numbers indicate identical or functionally similarly elements. Additionally, the left-most digit of a reference number identifies the drawing in which the reference number first appears.

BRIEF DESCRIPTION OF THE FIGURES

The present invention will be described with reference to the accompanying drawings, wherein.

Detailed Description of the Preferred Embodiments

The present invention is a tape threading mechanism for feeding the leader block end of a single reel tape cartridge through a tape transport system. The tape threading mechanism of the present invention is elevated above the tape transport path.

In the preferred embodiment of the present invention, the raised linear threading mechanism is configured to thread the leader block of a 3480-type magnetic tape cartridge through a helical scan transport system. This helical transport mechanism is a modified version of the Panasonic AG-D350 Digital Studio Video Tape Recorder (VTR), manufactured by Panasonic Broadcasting System Co., Secaucus, N.J., USA. This helical scan transport system illustrated in FIG. 1 supports a specific form factor suitable for use with a Storage Technology Corporation Model 4400 Automated Cartridge System (ACS). This helical tape transport system is described in detail in the above-referenced commonly owned U.S. patent application Ser. No. 08/060,653 titled "Helical Scan Transport for Single Reel Tape Cartridge." The 4400 ACS is described in U.S. Pat. Nos. 4,864,511, 4,928,245, and 4,932,826 to Moy et al., the full text of which are hereby incorporated by reference.

Figure 1:
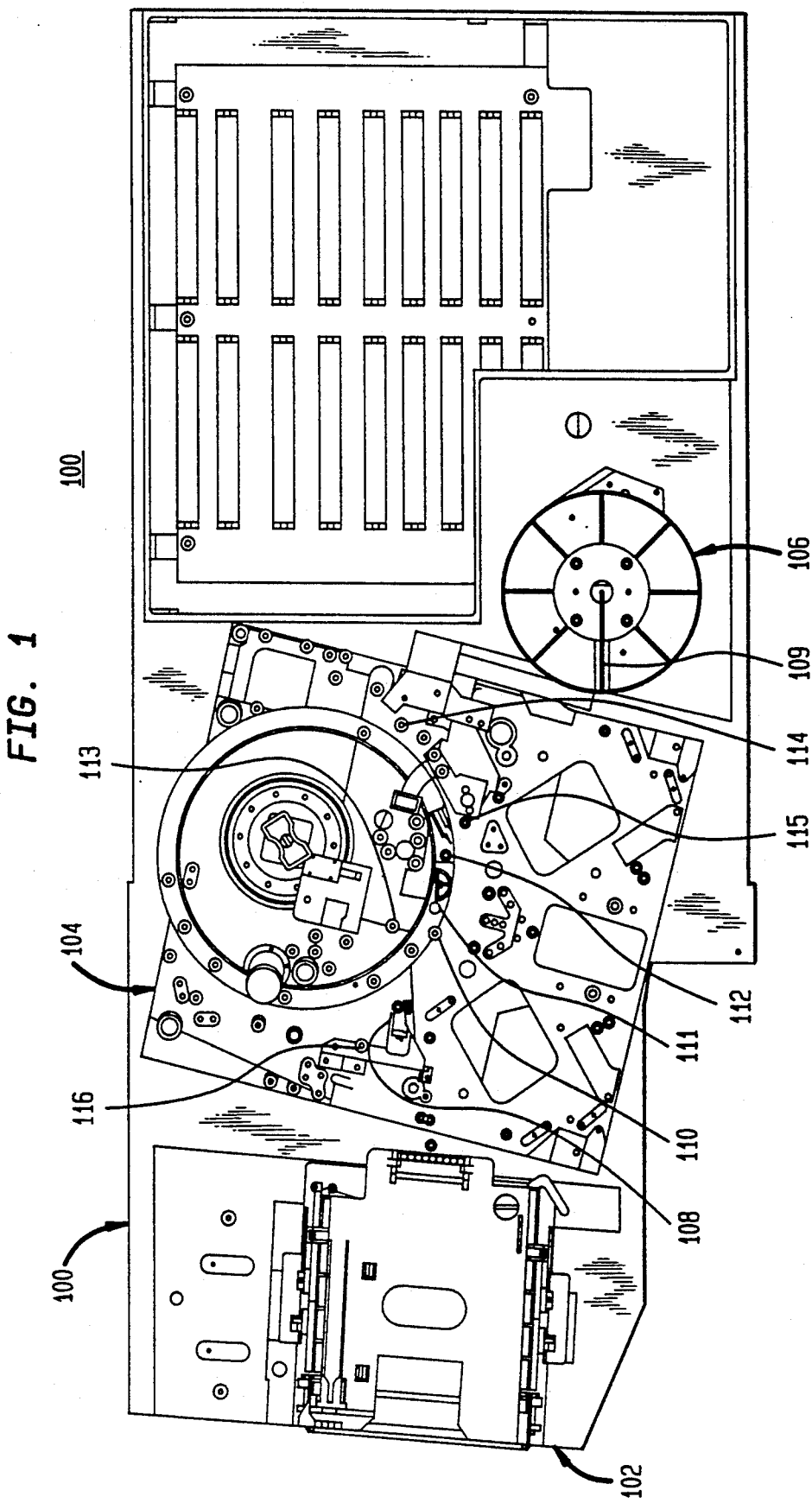
FIG. 1 is a top view of the helical transport of the invention.

Referring to FIG. 1, the modified helical tape transport system 100 is comprised of three main assemblies: elevator assembly 102, helical drive assembly 104, and take-up reel assembly 106. As shown in FIG. 1, these three components are arranged in a linear fashion due to the form factor requirements discussed above. Therefore, conventional jointed-arm threading mechanisms cannot be used due to their inability to thread the tape from the elevator assembly 102 through numerous tape guideposts to the take-up reel while staying within the rqequired form factor.

Figure 2:
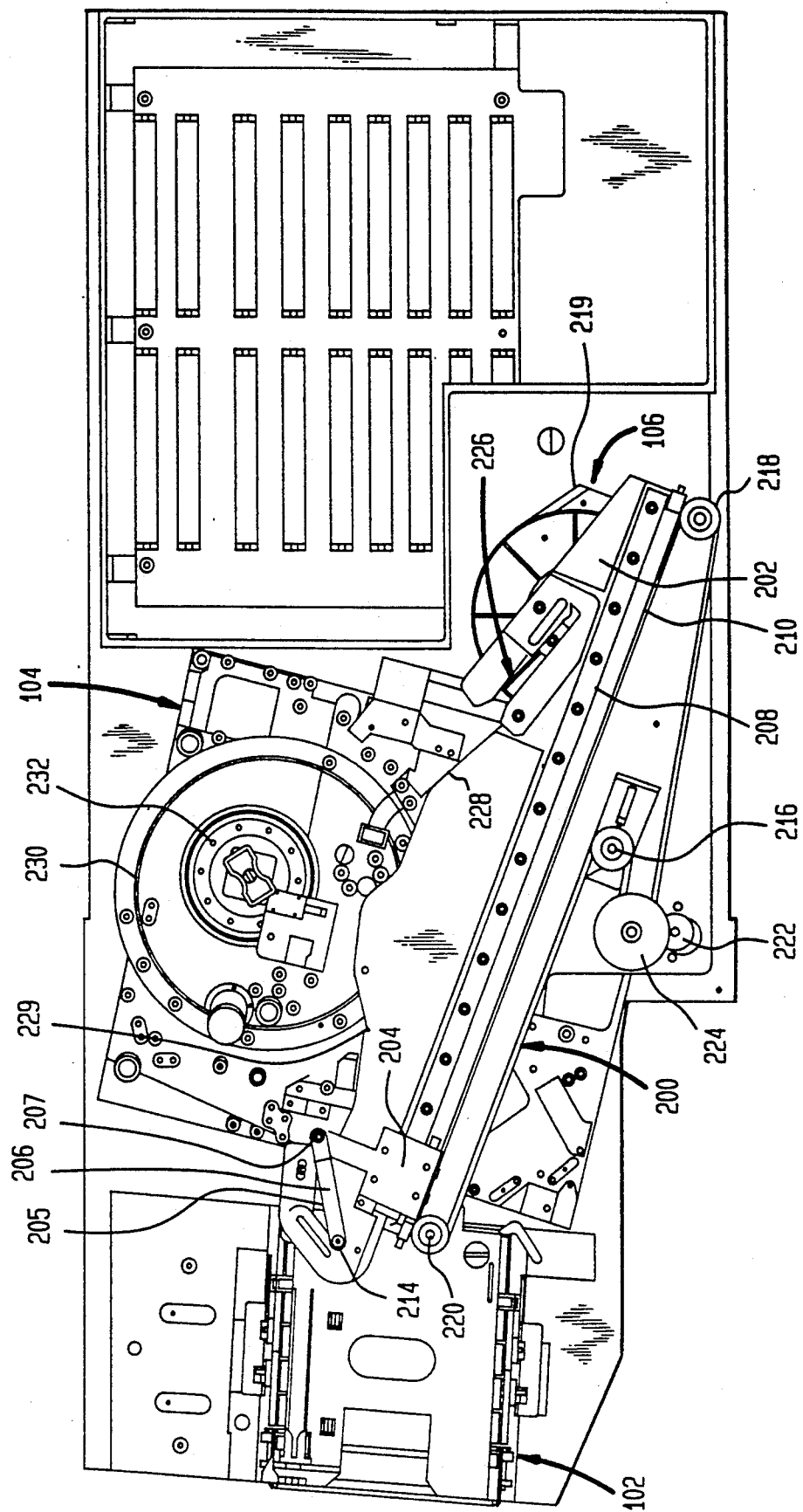
FIG. 2 is a top view of the helical transport of the invention with the linear tape threading mechanism.
Figure 3:
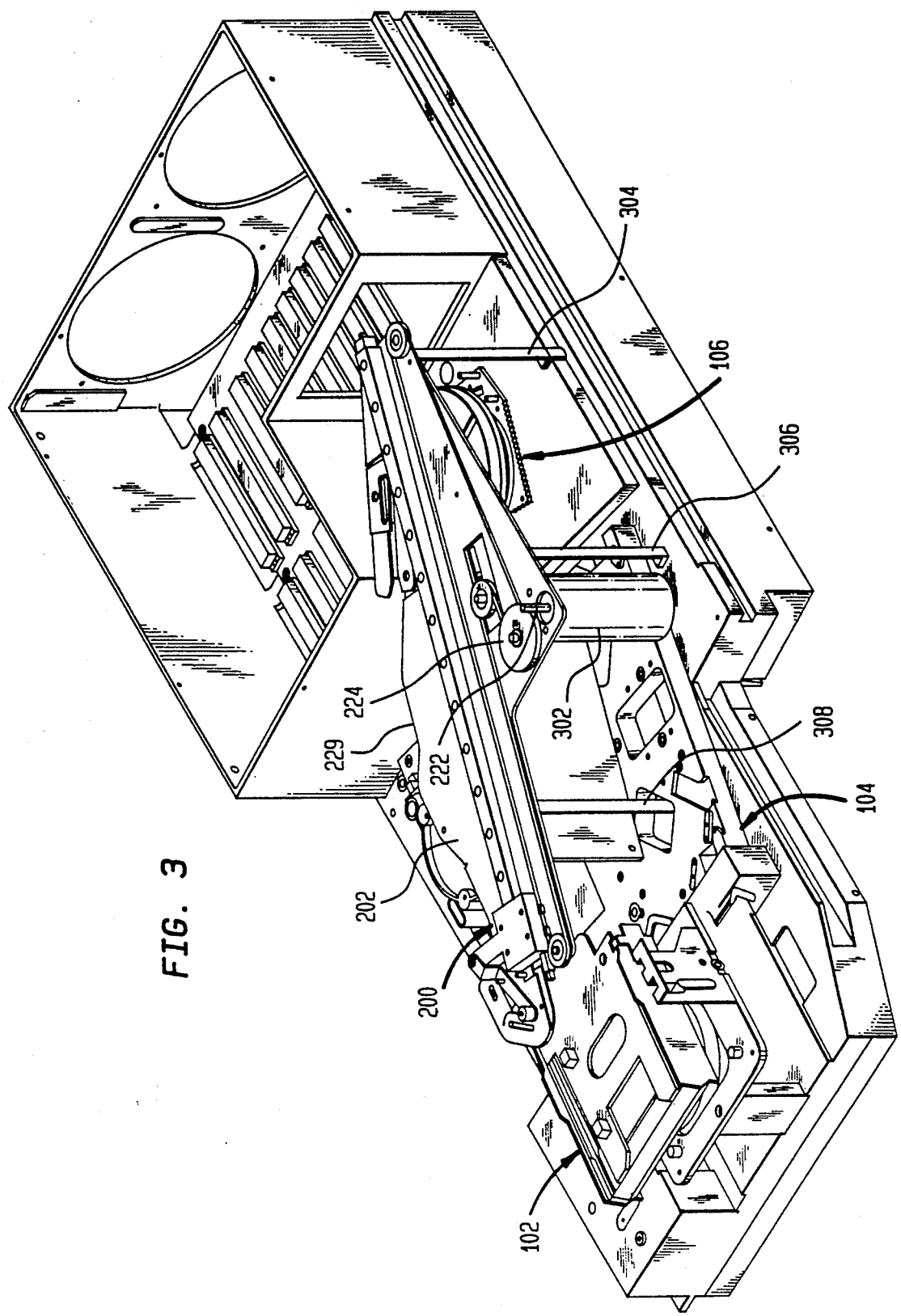
FIG. 3 is a perspective view of the helical transport of the invention.
Figure 4:
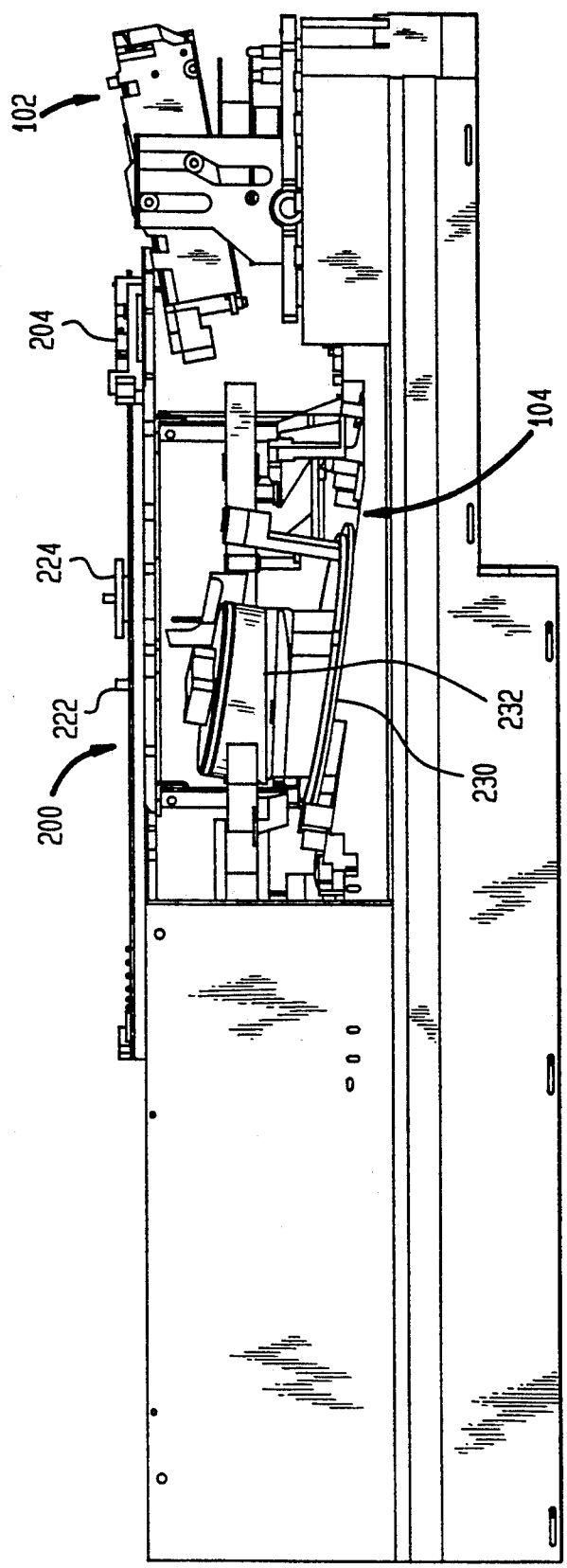
FIG. 4 is a left side view of the helical transport of the invention.
Figure 5:
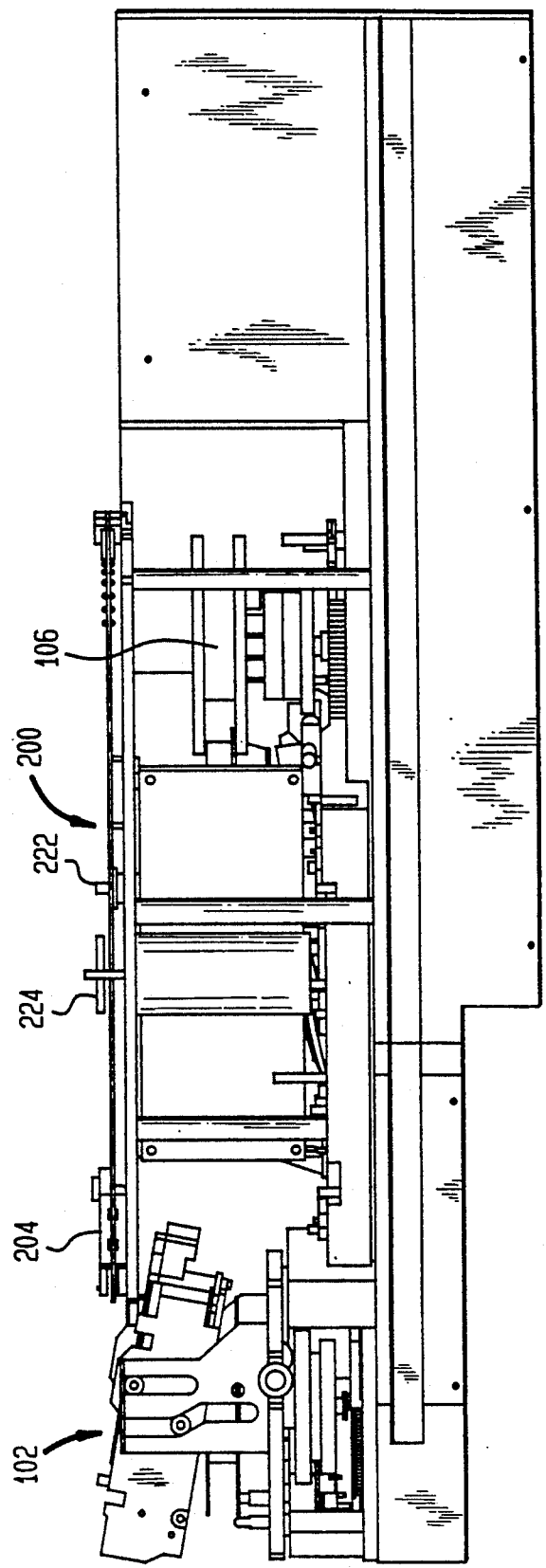
FIG. 5 is a right side view of the helical transport of the invention.

The helical scan transport utilizing the elevated linear tape transport system of the present invention is now described in detail with reference to FIGS. 2-5. FIG. 2 is a top view, FIG. 3 is a perspective view, FIG. 4 is a left side view, and FIG. 5 is a right side view of helical scan transport system 100. Elevator assembly 102 is configured to receive a tape cartridge and to load the cartridge into transport 100. Helical deck 104 includes a rotary scan head 232, a loading ring 230, and a plurality of guideposts and capstans which make up a tape path (discussed below).

Linear threading mechanism 200 is comprised of a platform 202 supported by posts 304, 306 and 308 (and others not shown) which maintain platform 202 in an elevated position above elevator assembly 102, helical drive assembly 104, and take-up reel assembly 106.

The linear threading mechanism 200 retrieves the leader block from the magnetic tape cartridge inserted into the elevator assembly 102 and threads the leader block and associated magnetic tape through the various guideposts to the take-up reel assembly 106. Linear threading mechanism 200 consists of linear arm 204 which rides along linear bearing 208 under the control of motor 302 and belt 210. Attached to linear arm 204 is a pivot arm 206 which pivots about pivot point 207. On the opposite end of pivot arm 206 is threading pin 214. Threading pin 214 is designed to attach to and retrieve the leader block from the tape cartridge.

Linear threading mechanism 200 has a cam track 228 which extends from a magnetic tape channel 205 to a take-up reel channel 226. Cam track 228 is the path along which threading pin 214 travels as the linear arm 204 travels along linear bearing 208. Linear arm 204 is of such a configuration that the pivot arm 206 can pivot freely around pivot point 207 to enable the threading pin 214 to travel freely along cam track 228.

In order to maintain threading pin 214 in cam track 228, the threading pin 214 is under a spring force at pivot point 207. This spring force urges threading pin 214 against cam track 228 as the linear arm 204 travels along linear bearing 208.

As shown in FIGS. 2 and 3, cam track 228 has a profile which corresponds to the path which the tape is required to be positioned or preloaded in helical tape transport 100. Since cam track 228 is placed at the edge 229 of platform 202, the profile of cam track 228 is determined by the profile or shape of edge 229. Hence, as linear arm 204 travels along linear bearing 208, the pivot arm 206 pivots about pivot point 207 while the threading arm 214 travels along cam track 228 at edge 229. In doing so, the tape cartridge leader block is pulled through the predetermined tape path and inserted into take-up reel assemble 106.

The servo-control of linear threading mechanism 200 is described in detail in commonly owned, co-pending U.S. patent application Ser. No. 08/060,653, filed on Mar. 26, 1993, titled "System and Method for Magnetic Tape Leader Block Extraction," and naming as inventor Bruce McWilliams Davis application Ser. No. 08/037,451, which is incorporated herein by reference.

Servo motor 302 is positioned adjacent to helical drive assembly 104 such that motor shaft 222 extends up through platform 202 to contact gear 224. Gear 224 then controls the movement of belt 210 which is wrapped around pulleys 216, 218 and 220. Belt 210 is attached to linear arm 204, thereby enabling servo motor 302 to control the movement of linear arm 204.

The tape cartridge is loaded into a elevator assembly 102 which includes a plurality of well-known elements not illustrated in the Figures for simplicity purposes including: a drive motor, servo mechanism, eject mechanism, etc. When positioned in elevator assembly 102, the tape cartridge is substantially coplanar with take-up reel 219. In addition, helical drive assembly 104 is substantially coplanar with and located between elevator assembly 102 and take-up reel 219.

In the helical tape transport system 100 illustrated in FIGS. 1 and 2, a plurality of fixed tape guideposts 108, 110, 112, 114, 116 are provided to position the magnetic tape along a predetermined tape path. In operation, tape threading pin 214 is pivotally attached to linear arm 204 and operates by moving along the cam track 228 to grasp the leader block from the tape cartridge and thread the magnetic tape along the tape path to take-up reel 219 where the leader block is inserted into slot 109. Tape threading pin 214 positions the magnetic tape along fixed guides 108, 110, 112, 114, 116 as it traverses its path.

Figure 6:
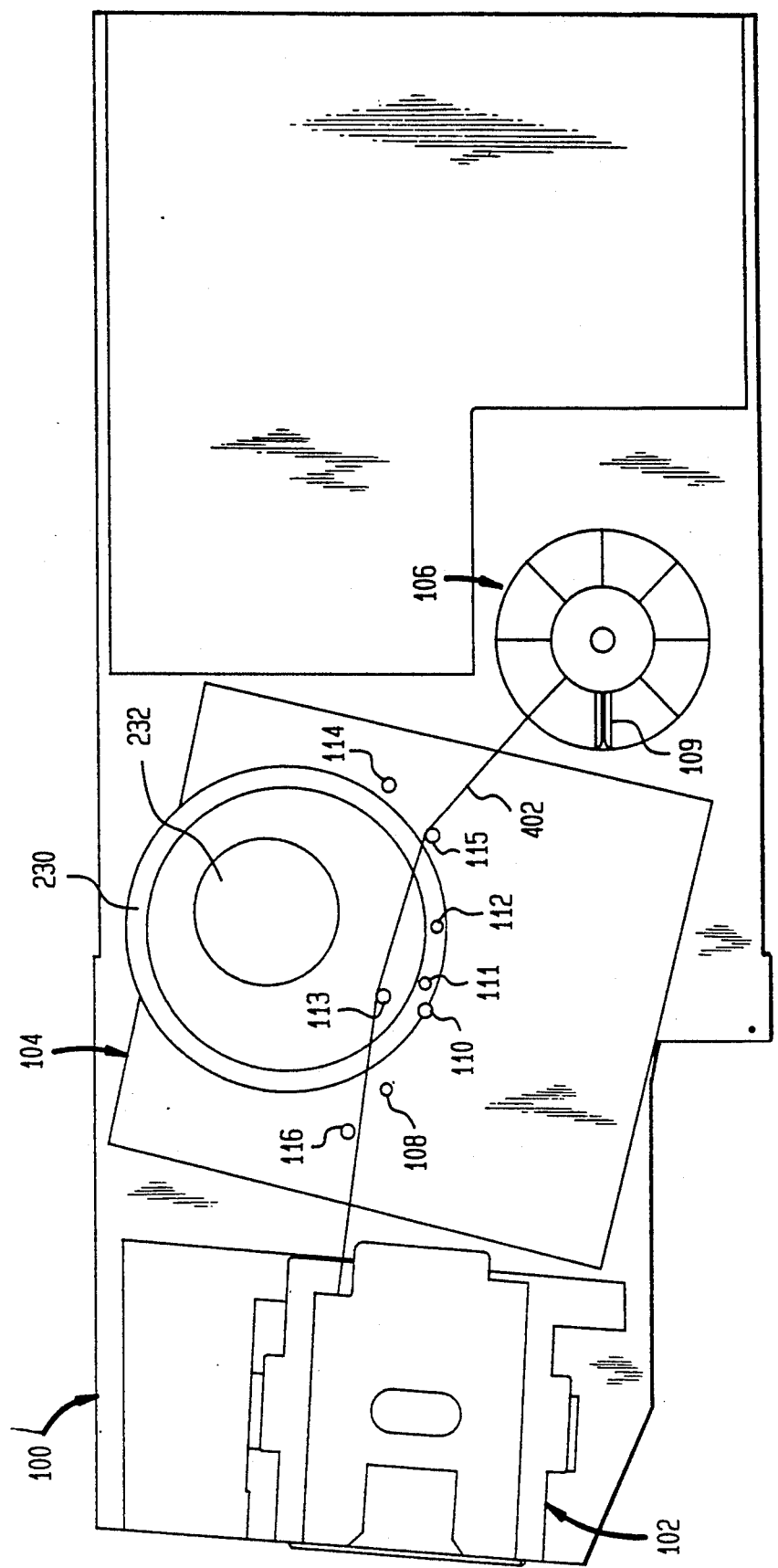
FIG. 6 is a simplified top view of the helical transport of the invention illustrating the dimensions and preloading tape path.

Referring to FIG. 6, a simplified view of the helical tape transport system 100 is illustrated. As shown in FIG. 6, tape path 402 is the path which is taken by the tape during the pre-load operation as the tape is threaded from the tape cartridge residing in elevator assembly 102 to the take-up reel assembly 106. During the pre-load operation performed by linear threading mechanism 200, the leader block of the tape is pulled under guidepost 116; over guideposts 108, 110, 113, 111, 112, and 115; under guidepost 114; and into slot 109 of take-up reel assembly 106. Guideposts 114, 115 and 116 are fixed-position guideposts of helical deck assembly 104. Guideposts 111 and 112 are mounted on loading ring 230 and move therewith to load the tape around helical head 232 for data read/write operations. Guidepost 115 is part of the inclined post assembly of helical drive assembly 104. Guidepost 113 is fixed on plate 202 and extends down therefrom into the tape path 402. Once the magnetic tape is wrapped around it, it acts as a pivot to align the leader block through guidepost 115 of the inclined post.

While various embodiments of the present invention have been described above, it should be understood that they have been presented by way of example, and not limitation. Thus, the breadth and scope of the present invention should not be limited by any of the above-described exemplary embodiments, which should be defined only in accordance with the following claims and their equivalents.

What is claimed is:

1. A linear threading apparatus for threading a tape through a predetermined path in a tape transport mechanism having an elevator assembly to receive a single-reel tape cartridge having a tape with a leader block, a tape drive assembly for reading and writing data on the tape, and a take-up reel assembly for receiving the tape, the apparatus comprising:
   a platform positioned above the predetermined path;
   a cam track in said platform;
   linear bearing means, having a first end and a second end, attached to said platform, for providing a substantially linear path from a first point at said first end of said linear bearing means proximate to the elevator assembly to a second point at said second end of said linear bearing means proximate to the take-up reel;
   linear arm means, slidably attached to said linear bearing means, for traveling along said substantially linear path established by said linear bearing means;
   threading arm means, having a first portion pivotally coupled to said linear arm means and a second portion moveable along said cam track, said threading arm means adapted to be coupled with the leader block; and
   drive means for moving said linear arm means along said linear bearing means.

2. The apparatus of claim 1, wherein said drive means comprises:
   a plurality of pulleys attached to a first side of said platform;
   a belt connected to said linear arm means and wrapped around said plurality of pulleys, said belt controlling the position of said linear arm means on said bearing means; and
   a motor coupled to said belt, said motor driving said belt to travel in a commanded direction to move said linear arm means between said first end and said second end of said bearing means.

3. The apparatus of claim 2, further comprising:
   support means for supporting said platform above the elevator assembly, tape drive assembly, and take-up reel assembly, such that said platform is substantially parallel with the predetermined path.

4. The apparatus of claim 3, wherein said cam track has a profile such that said threading arm means properly positions the tape along the predetermined path as said threading arm means travels along said cam track.

5. The apparatus of claim 4, wherein the tape transport is a helical tape transport.

6. A tape transport system, comprising:
   an elevator assembly means for receiving a single-reel tape cartridge having a web of tape with a leader block;
   a take-up reel assembly for receiving said leader block and said web of tape;
   a tape drive assembly including a read/write head and a plurality of guide means for receiving said web of tape and for directing said web of tape across said read/write head;
   a raised linear transport assembly for transferring said leader block from said tape cartridge to said take-up reel and for returning said leader block to said tape cartridge through a predetermined path including,
   a platform positioned above said predetermined path,
   a cam track in said platform,
   linear bearing means, having a first end and a second end, attached to said platform, for providing a substantially linear path from a first point at said first end of said linear bearing means proximate to said elevator assembly to a second point at said second end of said linear bearing means proximate to said take-up reel,
   linear arm means, slidably attached to said linear bearing means, for traveling along said substantially linear path established by said linear bearing means, and
   threading arm means, having a first portion pivotally coupled to said linear arm means and a second portion slidably coupled to and moveable along said cam track, said threading arm means adapted to be coupled with said leader block; and drive means for moving said linear arm means along said linear bearing means.

7. The apparatus of claim 6, wherein said drive means comprises:
   a plurality of pulleys attached to said platform;
   a belt connected to said linear arm means and wrapped around said plurality of pulleys, said belt controlling the position of said linear arm means on said bearing means; and
   a motor coupled to said belt, said motor driving said belt to travel in a commanded direction to move said linear arm means between said first end and said second end of said bearing means.

8. The apparatus of claim 7, further comprising:
   support means for supporting said platform above the elevator assembly, tape drive assembly, and take-up reel assembly, such that said platform is substantially parallel with said predetermined path.

9. The apparatus of claim 8, wherein said cam track has a profile such that said threading arm means properly positions said web of tape along said predetermined path as said threading arm means travels along said cam track.

10. A linear threading apparatus for threading a tape through a predetermined path in a tape transport mechanism having an elevator assembly to receive a single-reel tape cartridge having a tape with a leader block, a tape drive assembly for reading and writing data on the tape, and a take-up reel assembly for receiving the tape, the apparatus comprising:
   a platform positioned above the predetermined path;
   a cam track in said platform;
   linear bearing means attached to said platform, having a first end and a second end, for providing a substantially linear path from a first point proximate to the elevator assembly to a second point proximate to the take-up reel;
   linear arm means, slidably attached to said linear bearing means, for traveling along said substantially linear path;
   threading arm means, having a first portion pivotally coupled to said linear arm means and a second portion moveable along said cam track, said threading arm means adapted to be coupled with the leader block; and drive means for moving said linear arm means along said linear bearing means, including,
a plurality of pulleys attached to said platform,
a belt connected to said linear arm means and wrapped around said plurality of pulleys, said belt controlling the position of said linear arm means on said linear bearing means, and
a motor coupled to said belt, said motor driving said belt to travel in a commanded direction to move said linear arm means along said substantially linear path.

11. The apparatus of claim 10, further comprising:
support means for supporting said platform above the elevator assembly, tape drive assembly, and take-up reel assembly, such that said platform is substantially parallel with the predetermined path.

12. The apparatus of claim 11, wherein said cam track has a profile such that said threading arm means properly positions the tape along the predetermined path as said threading arm means travels along said cam track.

13. The apparatus of claim 12, wherein the tape transport is a helical tape transport.

* * * * *